United States Patent [19]

Huls et al.

[11] 4,181,217

[45] Jan. 1, 1980

[54] CONVEYOR-BELT DRUM

[75] Inventors: Fritz Hüls, Velbert; Paul W. Hentze, Wuppertal, both of Fed. Rep. of Germany

[73] Assignee: Fritz Steller GmbH & Co. KG, Wuppertal, Fed. Rep. of Germany

[21] Appl. No.: 837,468

[22] Filed: Sep. 28, 1977

[30] Foreign Application Priority Data

Aug. 16, 1977 [DE] Fed. Rep. of Germany ....... 2736920

[51] Int. Cl.² ............................................. B65G 39/10
[52] U.S. Cl. ..................................... 198/842; 29/117; 74/230.3; 193/37
[58] Field of Search .................. 198/835, 842; 193/37; 74/230.3; 29/117

[56] References Cited

U.S. PATENT DOCUMENTS

| 2,736,205 | 2/1956 | Dunne, Jr. | 193/37 |
| 2,749,133 | 6/1956 | Rich | 29/117 |
| 3,661,246 | 5/1972 | Faunce et al. | 198/842 |

FOREIGN PATENT DOCUMENTS

| 215887 | 6/1961 | Austria. | |
| 1804044 | 5/1970 | Fed. Rep. of Germany | 198/842 |
| 2400701 | 7/1974 | Fed. Rep. of Germany | 193/37 |
| 2401308 | 7/1975 | Fed. Rep. of Germany | 193/37 |

*Primary Examiner*—Jeffrey V. Nase
*Attorney, Agent, or Firm*—Montague & Ross

[57] ABSTRACT

A conveyor-belt drum comprises a cylindrical drum shell surrounding a shaft and carried by a pair of spaced-apart support disks mounted on this shaft. Between the outer periphery of each disk and the inner surface of the drum there is provided a wedge member which carries an elastic insert urged against either the inner surface of the shell or the outer surface of the disk. The outer surface of the disk and the inner surface of the wedge member have frustoconical peripheries along which they are relatively displaceable by a screw.

11 Claims, 10 Drawing Figures

4,181,217

CONVEYOR-BELT DRUM

FIELD OF THE INVENTION

Our present invention relates to a conveyor-belt drum of the type in which a cylindrical shell is mounted by drum bottoms or support disks upon a shaft with interposition of elastic inserts.

BACKGROUND OF THE INVENTION

There have been provided heretofore conveyor-belt drums having a drum shell and a pair of axially spaced drum bottoms or support disks which are mounted upon a common shaft to enable the drum to be rotated about the axis of this shaft. The drum bottoms can be fixed to the shaft to rotate therewith and each drum bottom or support disk can bear upon the inner surface of the cylindrical shell via a prestressed or simply stressed entropy-elastic, usually elastomeric (rubber), insert so that the drum shell is elastically mounted upon the support disks.

A conveyor-belt drum of the aforedescribed type has been described in German Offenlegungsschrift (published application) No. 1,804,044.

The advantage of such a conveyor drum resides in the fact that an elastomeric insert provides the sole force-transmitting connection between the support disks and the drum shell, thereby enabling the drum shell and the support disks to undergo compensating relative displacements (alignment equalization). This compensatory relative movement eliminates difficulties which may be encountered when nonuniform forces are applied to the relatively stiff shell, as when the shaft is subjected to bending stresses or the like.

In spite of the significant advantages resulting from the provision of an elastic element between the support disks and the drum shell, the prior-art conveyor-belt drum described above nevertheless has some disadvantages primarily because of difficulties which are encountered in the insertion of the drum bottoms or support disks into the shell and in the mounting of the elastomeric insert therein.

In the prior system mentioned above, the elastomeric body is held in place by an annular rigid auxiliary body having an outer or inner conical surface. In one construction, the support disk together with the insert body is pressed along the inner conical surface into the drum shell. In another construction, an ancillary device is required to hold the annular insert while the support disk with the aforementioned auxiliary body is displaced.

Neither of the aforedescribed mounting methods, which require expensive hydraulic stressing tools, care in maintaining the drum shell against axial movement, and complicated manipulation techniques, has proved to be fully successful. A replacement of the drum shell of a large conveyor-belt installation, e.g. in a mine or other subterranean site, when required by wear, is not possible on the site and can only be carried out in a workshop or factory. This is a distinct disadvantage.

Another disadvantage of conventional conveyor-belt drums provided with elastic inserts between a support disk and the drum shell is that an afteradjustment, i.e. an increased compression of the insert, is not possible once this system has been assembled. Such adjustment is desired when, because of wear, aging or the like, there occurs a decrease in the force with which the insert bears upon the two members between which it is disposed.

Mention may be made of German Democratic Republic Pat. No. 8430 which describes means enabling adjustment of an annular elastic body between a roller support and the outer member of a conveyor roller by using the axial compression of the elastic member between two such bottoms or disks. The disadvantage of this system is that the stressing of the elastic body is only a quasi-hydraulic outward deformation of the body by the application of axial squeezing forces. This technique has not been found to be practical for conveyor-belt drums, especially for subterranean applications of the type previously described.

It is also important, where an elastic member is to be stressed in the manner described, that the displacement in the axial direction of the elastic member is not excessive since long displacements result in high shear stressing of that member.

OBJECTS OF THE INVENTION

It is the principal object of the present invention to provide a conveyor-belt drum which improves upon the prior-art arrangements described above and which is free from the disadvantages of these earlier arrangements and provides a relatively simple system for elastically connecting the drum shell with a pair of support disks so that the mounting and dismounting of the shell is facilitated and afteradjustment of the elastic insert can be readily achieved.

Another object of this invention is to provide an improved conveyor-belt drum, particularly for use in subterranean (e.g. mining) applications, whereby the shell is elastically mounted upon the support disks in an improved manner resulting in reduced wear and stressing of the elastic element.

SUMMARY OF THE INVENTION

In accordance with our present invention, a sheet-steel shell coaxially surrounding a shaft is supported by a pair of steel disks spacedly mounted on that shaft, each disk defining with that shell an axially narrowing annular gap bounded by an inner, cylindrically curved peripheral shell, surface and an outer, frustoconically curved peripheral disk surface. Each gap is occupied by a plurality of segmental wedge members substantially complementing one another to a ring; each wedge member has a cylindrically curved outer surface and a frustoconically curved inner surface, the latter being either complementary or parallel to the peripheral disk surface. A plurality of compressible strips of elastomeric material are interposed between respective wedge members and one of the aforementioned peripheral surfaces, specifically the inner shell surface when the wedge members are in sliding contact with the frustoconical disk surface. Releasable adjustment means, such as bolts traversing each wedge member, serve for axially displacing same toward the narrower gap end along the peripheral surface in sliding contact therewith.

According to a more specific feature of our invention, each wedge member carries at the wider end of the gap, on a surface spacedly confronting the peripheral surface not in sliding contact therewith, an arcuate shoulder extending radially toward that noncontacting surface but terminating short thereof to facilitate further radial shifting of the wedge member. Upon axial displacement of the wedge member toward the narrower gap end, the associated strip undergoes increasing compression while being entrained by the arcuate shoulder.

Each adjusting bolt or screw advantageously has a shank with an unthreaded portion passing with radial clearance through a wider bore in the respective wedge member and with a threaded extremity engaging a retaining element. The latter may comprise a peripheral flange integral with the respective disk; alternatively, with the frustoconical disk surface tapering substantially symmetrically in opposite directions from a central annular ridge, the retaining element may be another wedge member of opposite conicity bearing upon the shell surface or the disk surface through another compressible strip. If the two confronting wedge members are in sliding contact with the disk surface, they engage respective parts of that surface on opposite sides of its central ridge.

BRIEF DESCRIPTION OF THE DRAWING

The above and other features and advantages of the present invention will become more readily apparent from the following description, reference being made to the accompanying drawing in which.

SPECIFIC DESCRIPTION

Figure 1:
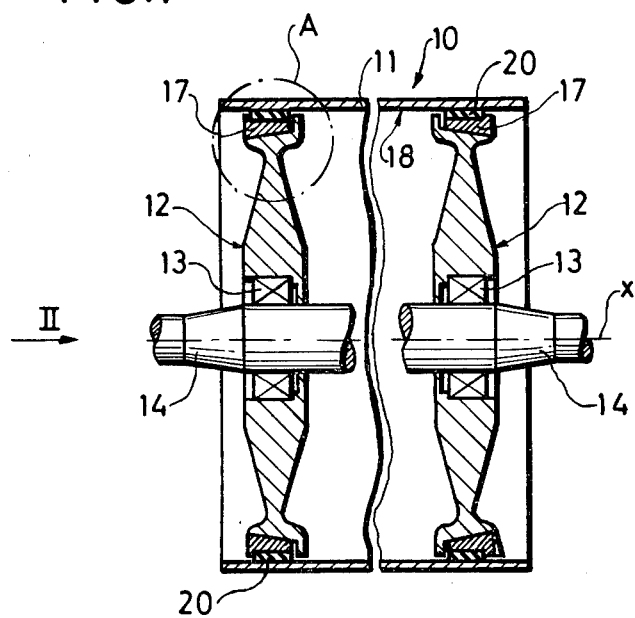
FIG. 1 is a longitudinal (axial) cross-section through a conveyor-belt drum according the the invention.
Figure 7:
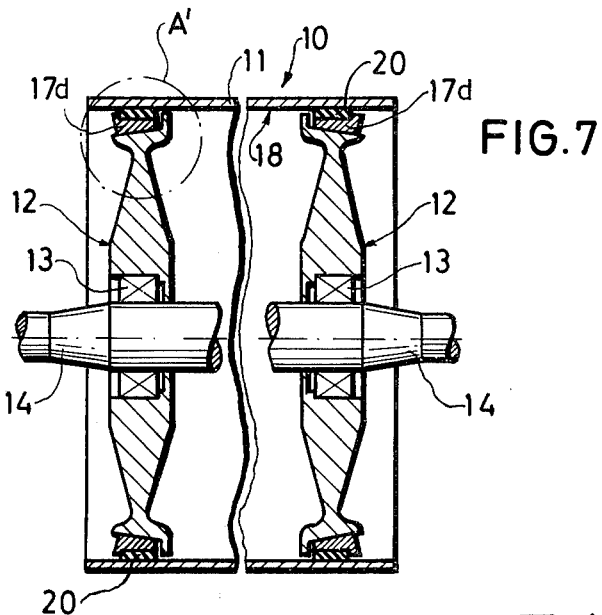
FIG. 7 is a longitudinal cross-section showing yet another conveyor-belt drum embodying our invention.

A conveyor-belt drum 10 has been shown in simplified form in FIGS. 1 and 7 in longitudinal cross-section with only part of the drum being illustrated, the central region being broken away and removed. Details of the conveyor belt which passes around the drum and the journaling of the drum shaft or of the drum on the shaft have not been indicated and are conventional.

In the broadest sense, the drum structure includes a cylindrical drum shell 11 of steel sheet and of circular cross-section which is supported by substantially disk-shaped circular drum bottoms or wheel disk structures 12 which can be composed of cast steel. These drum bottoms will be referred to hereinafter as support disks.

The disks 12 are secured by locking elements 13 to a drum axle or drum shaft 14 whose axis of rotation has been represented at x. Hence the shell 11, the support disks 12 and the shaft 14 rotate together.

Figure 8:
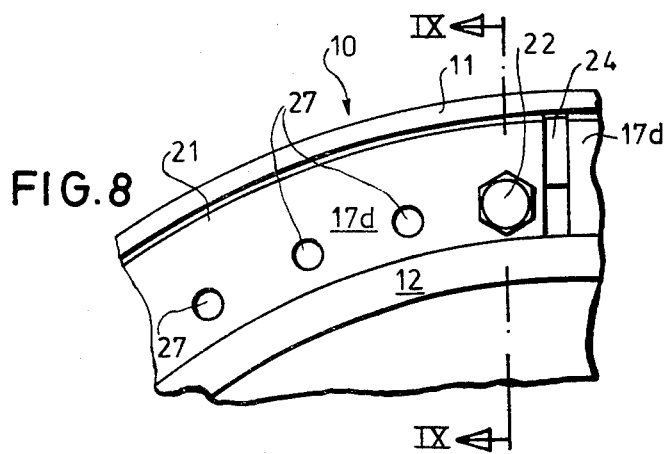
FIG. 8 is an enlarged detail view of a region corresponding to that represented at B in FIG. 2 but relating to the embodiment of FIG. 7.
Figure 9:
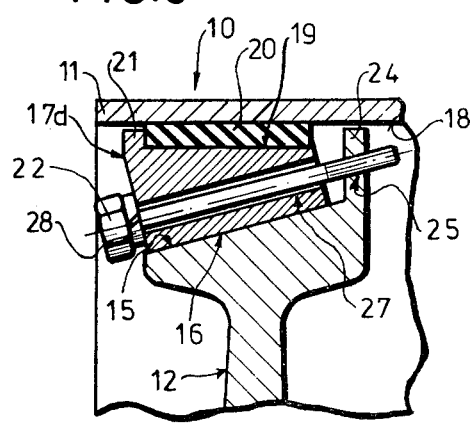
FIG. 9 is an enlarged detail view of the region A' of FIG. 7 constituting a longitudinal section along the line IX—IX of FIG. 8.

The outer peripheral surface 15 of each support disk 12 is of frustoconical configuration and is slidably engaged by a counter-frustoconical surface 16 of a wedge 17 (FIGS. 1-4), 17a (FIG. 5), 17c (FIG. 6) or 17d (FIGS. 7-9). A plurality of such wedges are provided as can be seen especially from FIG. 2 and are uniformly distributed about the periphery of the respective support disk 12. Each of these wedge members 17, 17a, etc. thus extends over an arc segment of a circle.

While the counterconical surface 16 extends parallel to the frustoconical outer periphery 15 of the support disk 12, the inner cylindrical surface 18 of the drum shell 11 extends parallel to the cylindrical outer surface 19 of each wedge member. The peripheral disk and shell surfaces 15, 18 are the boundaries of an annular gap narrowing axially toward the center of the drum.

This outer surface 19 carries an entropy-elastic, preferably elastomeric insert element 20. Each of these insert elements 20 bears, at its end turned toward an end of the drum, upon a shoulder 21 of the wedge member 17, 17a, 17c, 17d in the embodiments of FIGS. 1-5 and 7-10.

An adjusting screw or bolt 22 extends with its smooth shank portion through the wedge member 17 in the axial direction (substantially parallel to the axis of rotation x) by way of a smooth-walled bore 23 in which this shank is received with clearance. The clearance is formed in the embodiments of FIGS. 1-4 by designing the bore with an elongated cross-section in the radial direction as can be seen especially in FIGS. 3 and 4. In FIG. 3, three such bores 23 are shown without screws ahead of the screw 22.

Figure 2:
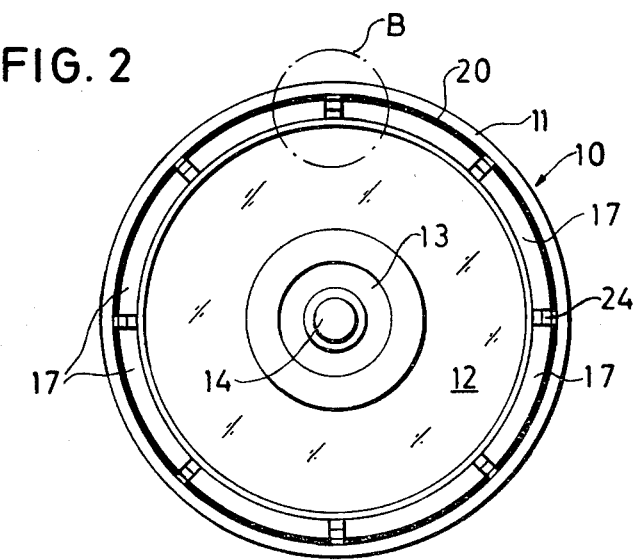
FIG. 2 is an end view taken in the direction of arrow II of the drum of FIG. 1.
Figure 3:
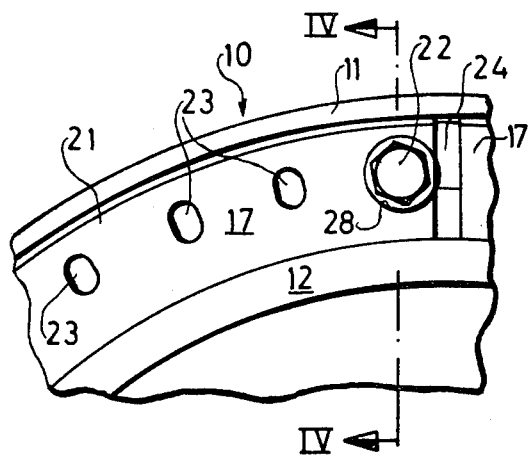
FIG. 3 is an enlarged detail view of the region B of FIG. 2.

It will be apparent especially from FIGS. 2, 3 and 8 that the wedge members are substantially segmental. In the constructions of FIGS. 5-10, the bores corresponding to bores 23 are represented at 27 and are of circular cross-section.

The threaded shank extremity of bolt 22, as can be seen in FIGS. 1-4 and 9, is screwed into a bore 25 of an outwardly extending circumferential shoulder or flange 24 of the support disk 11 confronting the center of the drum.

In the embodiment of FIG. 9, the smooth bore 27 registers with the threaded bore 25 although the common axis of these bores does not lie parallel to the axis x but rather is inclined thereto and lies parallel to the countersurface 16.

Figure 4:
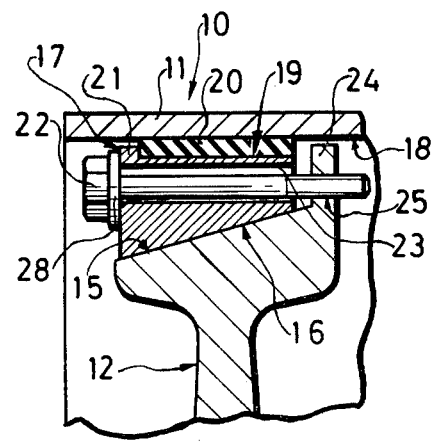
FIG. 4 is an enlarged view of the region A of FIG. 1 corresponding to a longitudinal cross-section along the line IV—IV of FIG. 3.

It should be clear that, simply by tightening or loosening the screws 22, the wedge members 17 etc. can be caused to move relative to the support disk 12 parallel to the axes of the screws 22, causing each wedge member 17 to ride along the surface 15 and hence to be displaced radially outward when the member is drawn to the right in FIG. 4. The insert 20 can be pressed with high force against the internal surface 18 of the shell 11 by a relatively axial displacement of the wedge member so that the shear forces applied to the insert are held to a minimum.

In FIG. 4 the device has been shown in its tightened or clamped position in which the insert 20 is already pressed against the inner shell surface 18. It can be seen that in this position the radial shoulder 21 as well as the radial flange 24 is spaced radially from the inner shell surface 18 to permit some movement of the support disk 12 relative to the shell 11.

As will be apparent from FIGS. 3-6 and 9-10, the adjusting screws 22 are held against undesired loosening by lock washers 28 which are clamped by the heads of the screws against the outer axial faces of the wedge members 17, 17a, 17b, 17c, 17d.

Figure 5:
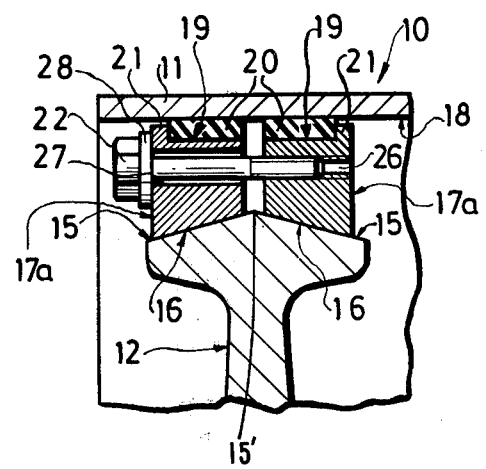
FIG. 5 is a view similar to FIG. 4 illustrating another embodiment of the invention.
Figure 6:
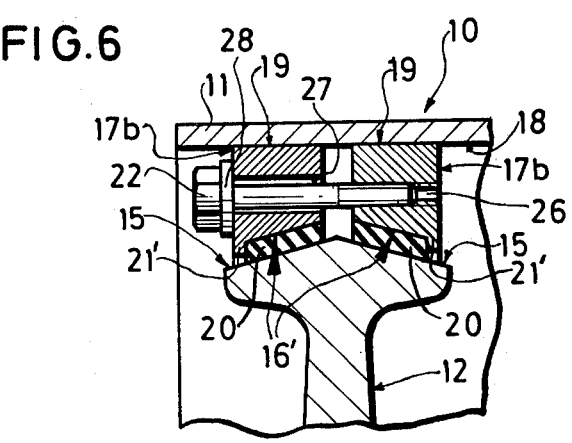
FIG. 6 is a view similar to FIGS. 4 and 5 illustrating still another embodiment of the invention.

FIGS. 5 and 6 show further embodiments of the invention in which the drums 10 are devoid of any radial flanges or abutments corresponding to the flanges or shoulders 24 of FIG. 4. Here, however, two oppositely effective and mutually symmetrical wedge members 17a or 17b are drawn together along oppositely inclined frustoconical surfaces 15 by the screws 20.

To this end, the support disks 12 are provided on their outer peripheries with coping-shaped frustoconically beveled outer surfaces 15 which include an obtuse angle between them and meet at a central annular ridge 15'. In both FIGS. 5 and 6, one of the wedge members 17a or 17b is provided with a smooth-walled axial bore 27 through which the smooth shank portion of bolt 22 passes with clearance while its extremity is screwed into an internally threaded bore 26 of the other wedge member 17a or 17b of each pair. The axial bores 26 and 27 are generally of circular cross-section.

In contradistinction to the embodiment of FIG. 5, that of FIG. 6 shows the insert 20 disposed between disk periphery 15 and a recessed inner surface 16' of the wedge member 17b. In either case the insert is axially entrained into the narrowing gap by an arcuate shoulder 21 or 21' of the wedge member extending toward the peripheral surface (18 or 15) opposite the one with which the wedge member is in sliding contact.

FIGS. 3–5 and 7–10 also show clearly that the shoulder seats 21 which serve to entrain the inserts 20 when the wedge members are moved in the axial direction always are spaced from the surface 18 against which the insert bears. Similarly, the inwardly directed radial shoulders 21' of the wedge members 17b are spaced from the outer frustoconical surfaces 15 of the drum disk 12 in FIG. 6. The clearances permit relative displacement of the support disks and the drum shell without direct (metal-to-metal) engagement.

Figure 10:
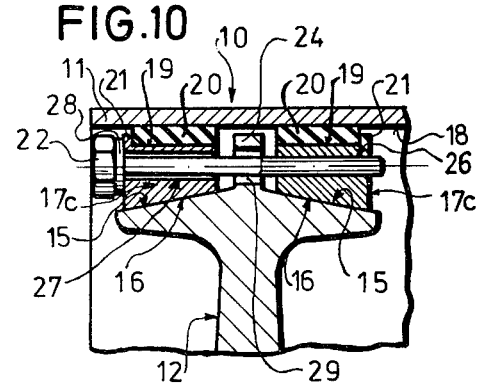
FIG. 10 is a view similar to FIG. 9 illustrating yet another embodiment of the invention.

In the embodiment shown in FIG. 10, the support disk 12 is provided between two oppositely inclined frustoconical surfaces 15 with an outwardly extending flange 24 along the peak of the disk profile, this flange forming a radial extension of the annualr ridge 15' shown in FIG. 5. The flange 24 is formed with a bore 29 traversed with clearance by the shank of the screw 22 which interconnects the two wedge members 17c. The passage 29 can be formed as an elongated hole whose largest dimension extends in the radial direction of the drum 10. This arrangement otherwise operates in a manner similar to that shown in FIG. 5 although it ensures that the wedge members will be retained in their angular positions relative to the support disk 12.

Especially when the system is used in mining or like subsurface applications or for the handling of dirt, soil or other particulate materials and wherever dust or particulates may penetrate into the drum, we have found to be it desirable to seal the openings between the pressure or wedge members 17. Such a sealing has been found to be especially advantageous when the drum 10 is a nondriven return drum about which a conveyor belt passes from a driving drum. In this case, the journaling for the drum may be provided between the two support disks 12. The sealing can be effected by filling the gaps between the wedge members 17 with an elastic or plastic synthetic which retains its yieldability with time.

We claim:

1. A conveyor-belt comprising:
   a cylindrical shell having a cylindrically curved inner peripheral surface;
   a shaft spacedly surrounded by and coaxial with said shell;
   a pair of support disks spacedly mounted on said shaft within said shell, each of said disks having a frustoconically curved outer peripheral surface separated by an axially narrowing annular gap from said inner peripheral surface;
   a plurality of segmental wedge members in each gap substantially complementing one another to a ring, each of said wedge members having a cylindrically curved outer surface and a frustoconically curved inner surface paralleling said outer peripheral surface of the respective disk, one of the peripheral surfaces bounding each gap being in sliding contact with the correspondingly curved surface of each wedge member;
   a plurality of compressible strips of elastomeric material each interposed between the other of said peripheral surfaces and a spacedly confronting surface of a respective wedge member, the latter being provided on said confronting surface with an arcuate shoulder extending radially toward but terminating short of said other of said peripheral surfaces on the wider end of said gap; and
   releasable adjustment means engaging each of said wedge members for axially displacing same toward the narrower end of said gap along the contacting peripheral surface with axial entrainment of the respective compressible strip.

2. A drum as defined in claim 1 wherein each of said adjusting means is a screw threaded into a retaining element on the respective disk.

3. A drum as defined in claim 2 wherein said retaining element is a radially outwardly extending flange integral with the respective disk.

4. A drum as defined in claim 2 wherein the outer peripheral surface of each of said disks tapers substantially symmetrically in opposite directions from a central annular ridge, said retaining element being a confronting wedge member of opposite conicity bearing through another compressible strip upon said other of said peripheral surfaces.

5. A conveyor-belt drum comprising:
   a sheet-steel shell coaxially surrounding a shaft;
   a pair of steel support disks spacedly mounted on said shaft within said shell, each of said disks defining with said shell an annular gap bounded by an inner cylindrical shell surface and an outer frustoconical disk surface;
   a plurality of segmental wedge member in each gap substantially complementing one another to a ring, each of said wedge members having a cylindrically curved outer surface and a frustoconically curved inner surface complementary to and in sliding contact with said outer frustoconical surface of the associated disk;
   a plurality of compressible strips of elastomeric material each inserted between said shell surface and said cylindrically curved surface of a respective wedge member; and
   bolt means traversing each of said wedge members in a generally axial direction in threaded engagement with a retaining element on the periphery of the associated disk for maintaining the respective strip under pressure between the wedge member and said shell.

6. A drum as defined in claim 5 wherein said bolt means comprises a bolt having a shank with a threaded extremity engaging said retaining element and with an unthreaded portion passing with radial clearance through a wider bore in the respective wedge member.

7. A drum as defined in claim 6 wherein said retaining element comprises a peripheral flange on the respective support disk.

8. A drum as defined in claim 6 wherein said frustoconical disk surface tapers substantially symmetrically in opposite directions from a central annular ridge, said respective wedge member contacting a part of said disk surface on one side of said ridge, said retaining element being a confronting wedge member of opposite conicity contacting a part of said disk surface on the other side of said ridge and bearing upon said shell surface through another compressible strip.

9. A drum as defined in claim 8 wherein said ridge is radially extended into a central annular flange having an aperture traversed with clearance by said shank.

10. A drum as defined in claim 6 wherein said respective wedge member has a radially extending shoulder at an edge remote from said retaining element for axially entraining said strip toward the latter.

11. A drum as defined in claim 5 wherein each of said strips is bonded to the respective wedge member.

* * * * *